United States Patent [19]

Fulton et al.

[11] 4,455,513
[45] Jun. 19, 1984

[54] SELF-STARTING TRANSDUCERLESS, BRUSHLESS D.C. MOTOR CONTROLLER

[75] Inventors: Donald E. Fulton, Stoneham; William P. Curtiss, Winthrop; William T. Fejes, Jr., Needham, all of Mass.

[73] Assignee: Imec Corporation, Boston, Mass.

[21] Appl. No.: 401,420

[22] Filed: Jul. 26, 1982

[51] Int. Cl.³ .................. H02K 29/00; H02P 7/00
[52] U.S. Cl. ....................... 318/138; 318/254; 318/439; 318/318; 318/696; 318/721
[58] Field of Search ............. 318/138, 254, 439, 721, 318/724, 331, 332, 334, 696, 318

[56] References Cited

U.S. PATENT DOCUMENTS

| | | | |
|---|---|---|---|
| 3,750,000 | 7/1973 | Bruckner et al. | 318/138 |
| 3,754,175 | 8/1973 | Girault | 318/138 |
| 3,794,895 | 2/1974 | Coupin et al. | 318/439 X |
| 3,896,357 | 7/1975 | Tanikoshi | 318/138 |
| 3,965,405 | 6/1976 | Romano | 318/331 |
| 3,999,108 | 12/1976 | Tanikoshi | 318/138 |
| 4,030,005 | 6/1977 | Doemen | 318/439 X |
| 4,085,577 | 4/1978 | Natori | 318/318 X |
| 4,097,788 | 6/1978 | Nygaard et al. | 318/138 X |
| 4,151,449 | 4/1979 | Takahashi | 318/696 X |
| 4,162,435 | 7/1979 | Wright | 318/138 |
| 4,250,435 | 2/1981 | Alley et al. | 318/254 X |
| 4,266,432 | 5/1981 | Schroeder et al. | 318/318 X |
| 4,275,343 | 6/1981 | Fulton et al. | 318/721 |

*Primary Examiner*—B Dobeck
*Assistant Examiner*—Paul Shik Luen Ip
*Attorney, Agent, or Firm*—Lee & Hollander

[57] ABSTRACT

A transducerless brushless permanent magnet motor in which a signal induced by the rotor in an unexcited winding is used to sense the rotor position. The sensed voltage, induced in the winding by the rotor, is integrated to provide a representation of the magnetic flux coupling the rotor and winding. Before start-up, both the rotor position and the integrator are initialized to align the circuit representation of the flux with the actual flux.

In an additional embodiment of the invention, a self-initialization circuit is provided to automatically preset the rotor and flux integrator to pre-determined and corresponding values.

24 Claims, 6 Drawing Figures

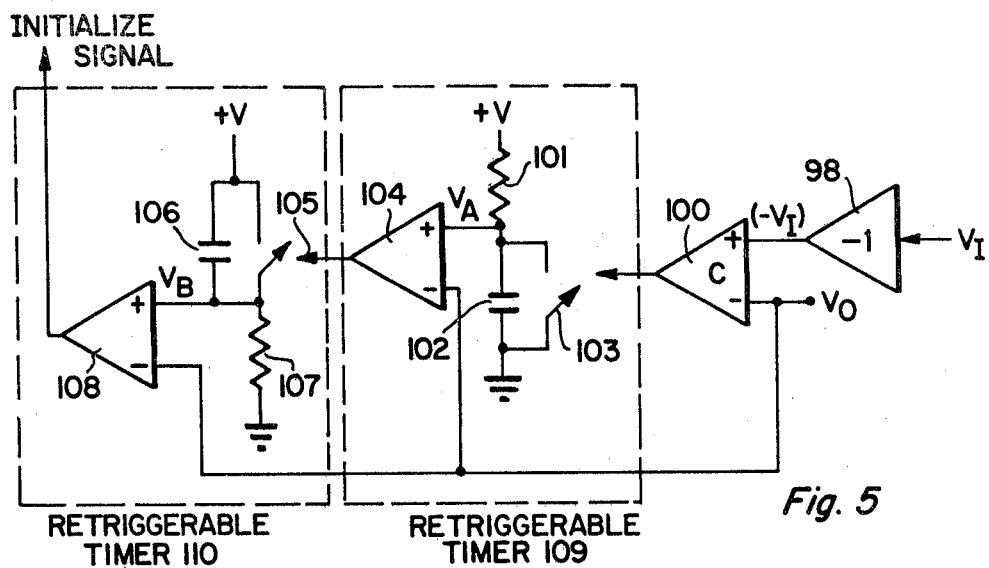
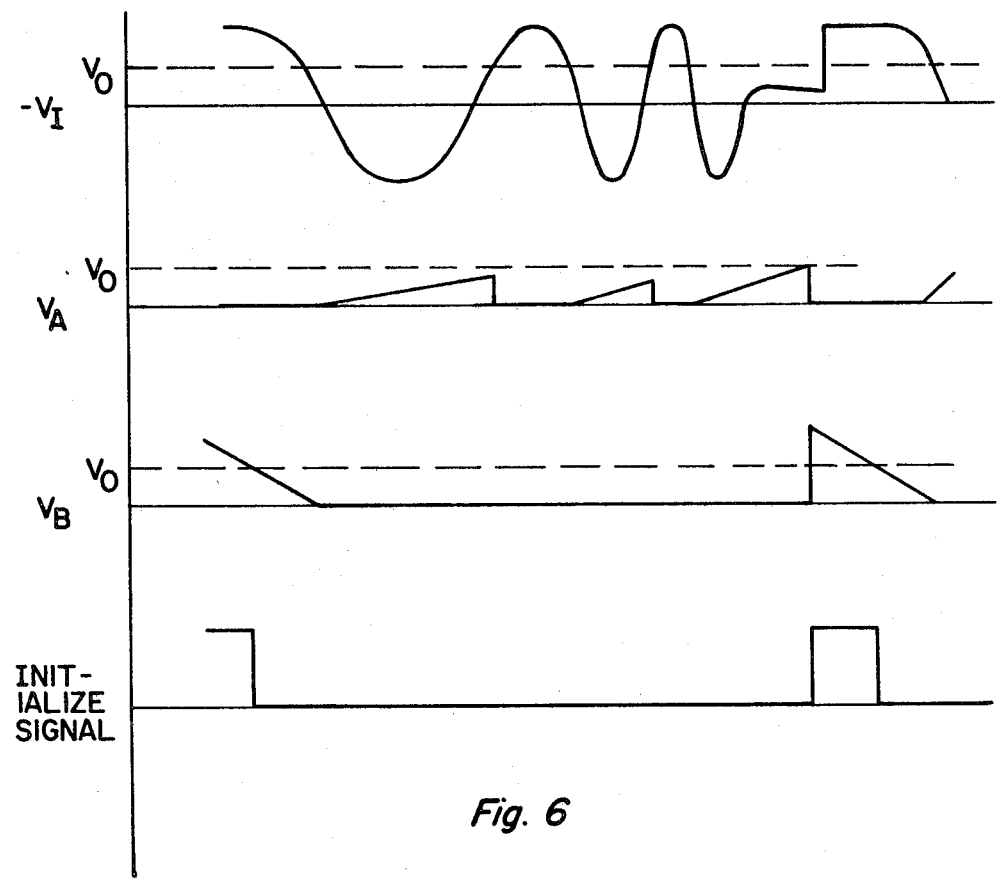

SELF-STARTING TRANSDUCERLESS, BRUSHLESS D.C. MOTOR CONTROLLER

FIELD OF THE INVENTION

This invention is related to transducerless, brushless, permanent magnet motors and more particularly to brushless permanent magnet motors which are self-starting without the need for rotor position transducers.

BACKGROUND OF THE INVENTION

Brushless permanent magnet motors are becoming more widely used in a variety of motor applications. Advantages of brushless permanent magnet motors over other types of AC motors include high efficiency, small size, and economy of fabrication. Additionally, in certain specialized applications, such as gyroscopes, the lack of leads to the rotating member and a minimum number of leads to the stationary member of a brushless permanent magnet motor are important.

A typical brushless permanent magnet motor operates by creating a rotating magnetic field with one or more drive-windings which apply a force to a magnetized rotor causing the rotor to rotate. (Alternatively, the magnet can be stationary with rotating windings, but this is less common.) The excitation signal applied to the motor drive-winding must be synchronized with the position of the permanent magnet rotor so that the proper force is applied to the rotor. Most brushless permanent magnet motor drive circuits require the motor to include a transducer to provide a signal representative of the rotor position with respect to the drive-winding, but the rotor position transducer adds to the complexity and expense of the motor. Extra conductors are required for the transducer signals, which can be a significant disadvantage in some applications, such as gyroscope wheel motors. Hall effect devices are frequently used to sense rotor position. Hall effect devices are, however, sensitive to high temperature. Thus, motor operating temperature range is restricted and reliability may be affected if the motor is overheated.

Permanent magnet motor drive circuits have recently been developed that do not require the motor to have a rotor position transducer. These drive circuits can determine the rotor position in a permanent magnet motor by sensing the voltages across and currents through the drive-windings of the motor and deriving the back EMF in the drive windings. From the back EMF the rotor position can be readily determined. See, for example, U.S. Pat. Nos. 4,162,435, 4,169,990, and 4,275,343. These circuits have difficulty, however, in reliably starting a torque-loaded permanent magnet motor from a stopped state. At zero or very low speeds, the back EMF from a permanent magnet motor stator is very small and difficult to accurately sense. Thus, until the present invention, in transducerless, brushless, permanent magnet motors, control of orientation of the stator magnetic field during start-up has been open loop; i.e. the stator field orientation has not been dependent on sensed rotor position. The consequence of this is that prior art drive circuits for transducerless, brushless, permanent magnet motors cannot reliably provide high torque during start-up, and hence cannot reliably start motors in many applications.

One common method for starting up a transducerless permanent magnet motor is to provide a circuit which during start-up causes the stator windings to produce a magnetic field which is independent of the rotor orientation and which initially rotates slowly and then gradually increases in speed. After the rotor has reached a certain speed, the magnitude of the back EMF signal becomes sufficiently large that it may be reliably used to indicate the rotor position. In some known implementations, control of stator orientation is switched abruptly from open loop to rotor (closed loop) control at a threshold speed. In other implementations, the transfer from open loop to closed loop control occurs gradually as the growing amplitude of the back EMF overcomes a bias signal.

In all transducerless brushless permanent magnet motors known prior to the invention only a small fraction of peak torque should be relied upon for a reliable start, so only lightly loaded motors can be reliably started. In addition starting is relatively slow. Also an additional circuit is sometimes necessary to monitor motor operation and provide an indication that the motor has not properly started, and in this circumstance the starting procedure is repeated.

SUMMARY OF THE INVENTION

The present invention is a drive circuit that when coupled to a brushless permanent magnet motor without a rotor position transducer produces a self-starting, brushless, transducerless permanent magnet motor which starts quickly and reliably, even when the motor is substantially torque loaded.

In brief, the present invention includes a transducerless brushless permanent magnet motor in which a signal induced by the rotor in an unexcited winding is used to sense the rotor position. The sensed voltage, induced in the winding by the rotor, is integrated to provide a representation of the magnetic flux coupling the rotor and winding. Before start-up, both the rotor position and the integrator are initialized to align the circuit representation of the flux with the actual flux. Thus the stator field orientation circuitry, usually known as commutation circuitry, operates in a closed-loop mode from turn-on allowing maximum rotor acceleration from a stopped position to the desired speed. In an additional embodiment of the invention, a self-initialization circuit is provided to automatically preset the rotor and flux integrator to pre-determined and corresponding values.

DESCRIPTION OF THE DRAWINGS

The advantages and operation of the present invention will become more clear upon reading the following description of the preferred embodiment in conjunction with the accompanying drawings, of which:

FIG. 5 is an exemplary automatic initializing and restarting circuit which may be used with the circuits of FIGS. 1 and 2; and FIG. 6 shows waveforms useful in explaining the operation of the automatic initializing and restarting circuit of FIG. 5.

DETAILED DESCRIPTION OF THE PREFERRED EMBODIMENT

Figure 1:
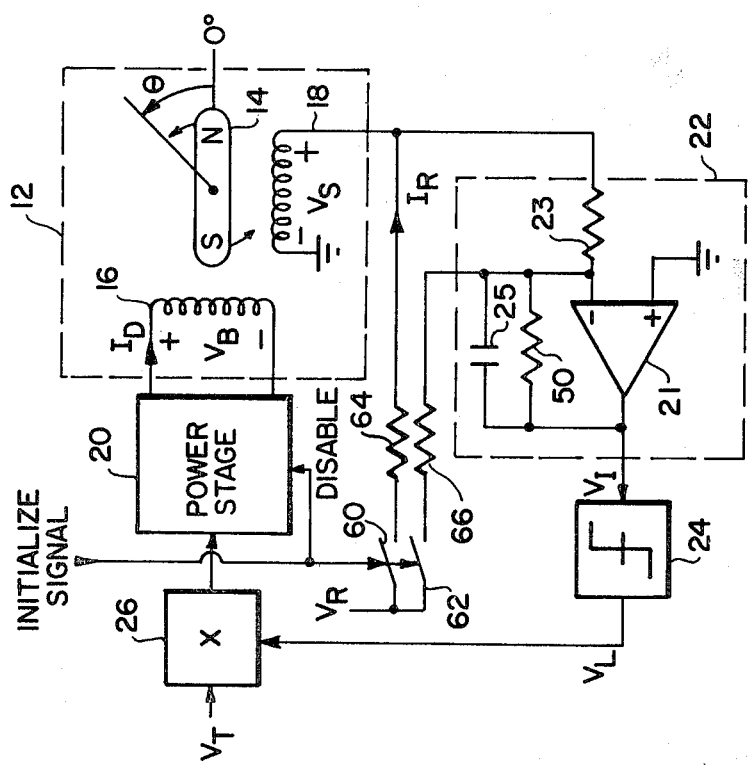
FIG. 1 is a block diagram of a preferred embodiment of the invention.

Referring to FIG. 1, there is shown a block diagram of a permanent magnet motor torque control circuit 5 embodying the present invention. A representative permanent magnet motor 12 includes a permanent magnet rotor 14 and two stator windings, 16 and 18 having a quadrature phase relationship. Winding 16 is a drive-winding to which a signal is applied by a power stage 20. The magnetic flux produced in winding 16 by the signal from power stage 20 interacts with the magnetic flux of the permanent magnet rotor 14 to apply a torque to the rotor.

Winding 18 is used as a sense winding when the motor is operating and provides an output signal in response to the changing flux from permanent magnet rotor 14 as the rotor rotates. The output signal from sense winding 18 is processed by circuitry described below to provide the proper signals to power stage 20 to drive rotor 14. As will become clear below, the present invention is especially useful with two winding permanent magnet motors. Similarly, the illustration in FIG. 1 of a permanent magnet motor having a moving magnet is exemplary, and the invention may be used with permanent magnet motors having stationary magnets and rotating windings or a motor having more than two windings.

One lead from sense winding 18 is grounded and the second lead is applied to an integrator circuit 22. Integrator 22 may be a conventional operational amplifier integrator. The input to integrator 22 is applied via input resistor 23 to the inverting input of an op-amp 21. The non-inverting input of op-amp 21 is grounded. Integrating capacitor 25 and bias resistor 50 are connected in parallel between the inverting input and the output of op-amp 21.

When the motor 12 is operating, the output signal $V_S$ from sense winding 18 is a nominal sine wave signal and is representative of the position of rotor 14. Since the voltage $V_S$ from winding 18 is the derivative of the changing magnetic flux coupling the magnetic rotor 14 and winding 18, integrator 22 serves to provide a representation of the magnetic flux, as well as filter out any noise in the back EMF signal from the sense winding and also provides a 90 degree phase shift in the sinusoidal output from the sense winding.

The output signal $V_I$ from integrator 22 is applied to a limiting circuit 24 in the embodiment shown in FIG. 1. Limiting circuit 24 serves to square up the $V_I$ output signal from integrator 22 to provide a square-wave signal $V_L$ in phase with the output from the integrator.

The output $V_L$ from limiter 24 is applied to a commutation circuit 26. A second signal $V_T$, representative of the magnitude of the torque to be applied to the rotor of the motor 12, is applied to a second input to commutator circuit 26. In response to the output signal $V_L$ from limiter 24, commutator 26 changes the polarity of the torque signal $V_T$. Thus, in the embodiment shown in FIG. 1, commutator 26 selectively changes the polarity of the current $I_D$ from power stage 20 in response to the limiter output signal $V_L$. In embodiments of the invention for use with multi-phase permanent magnet motors, commutator 26 will apply the torque signal $V_T$ to the proper windings with the proper phases. The design of commutator circuits for multiple winding motors is known in the art and the circuitry of commutator 26 for such multiple phase motors is readily designed. The output from commutator 26 is a periodic signal having a phase representative of the position of rotor 14 and having a magnitude proportional to the torque to be applied to the rotor of motor 12. The output signal from the commutator is applied to power stage 20, which causes a current $I_D$ to flow through drive-winding 16.

In some applications, such as fan motors, it is not necessary that the rotor of the permanent magnet motor be synchronized with an external speed command signal. In FIG. 1, the torque command signal $V_T$ is representative only of the polarity and magnitude of the torque to be produced by the motor, and need not include phase information representative of the rotor position. The simplest torque command signal $V_T$ is a DC reference voltage whose magnitude is representative of the torque to be applied to rotor 14. The reference voltage $V_T$ is commutated by commutator circuit 26 to drive rotor 14. The closed-loop commutation operation of the motor control circuit shown in FIG. 1 will then result in the motor speed increasing until external load torques balance motor torque and cause a steady state speed condition to be reached.

Figure 2:
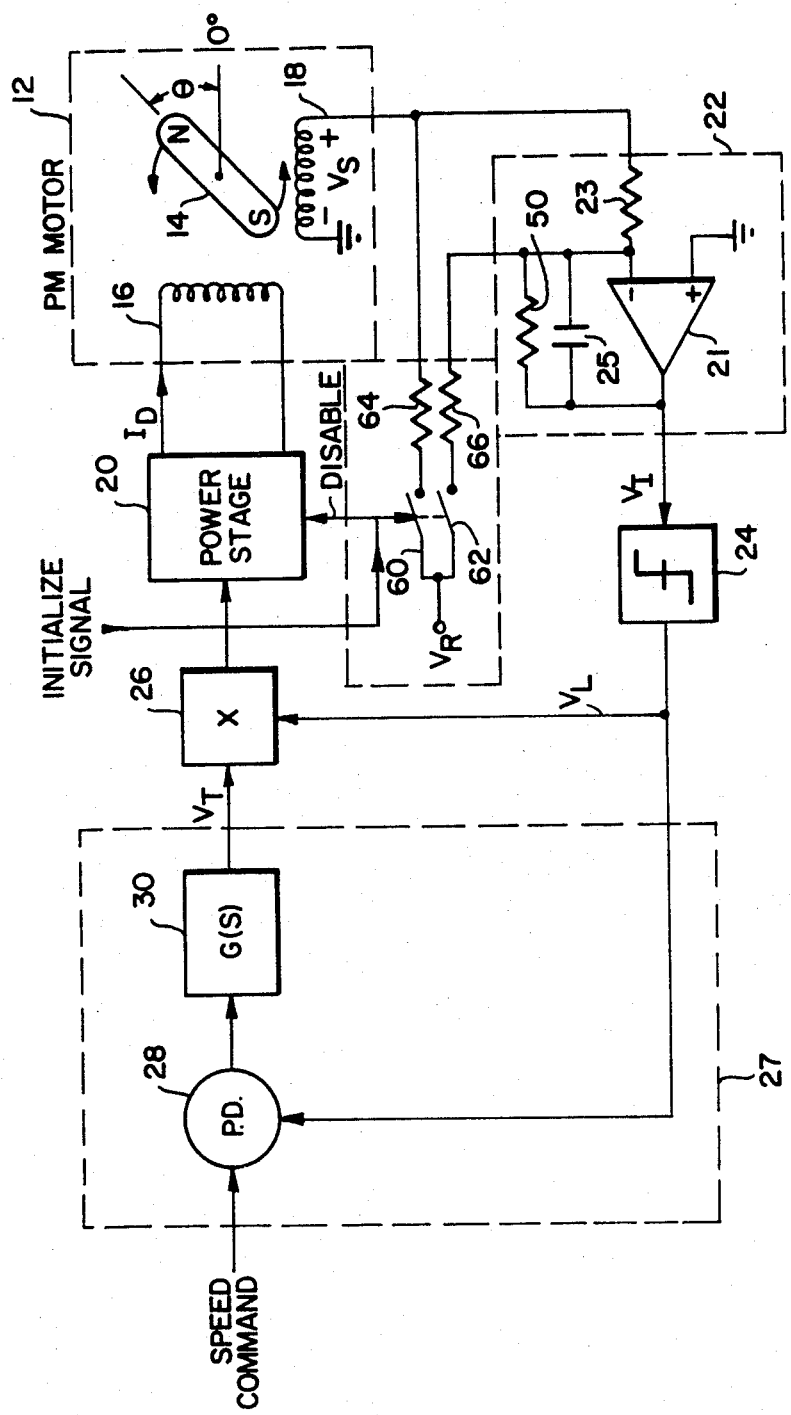
FIG. 2 is a block diagram of an alternate embodiment of the invention.

The present invention is also applicable to circuits which cause the motor to rotate at a preset speed or in synchronism with a speed control signal, as shown in FIG. 2. Referring to FIG. 2, the speed control circuitry is shown within box 27. The output signal $V_L$ from limiter 24 is applied to a commutator circuit 26 and also to a phase detector 28. A periodic, speed command signal is applied to a second input of phase detector 28. The circuitry of FIG. 2 causes the rotation of motor rotor 14 to become synchronized with the speed command signal by phase-locking the output signal from integrator 22 to the speed command signal. This mode of operation is well known to those in the art.

The output from phase detector 28 is a periodic signal whose average value is proportional to the phase error between the position of motor rotor 14 and the phase of the speed command signal. The output from phase detector 28 is applied to a compensation circuit 30 having a transfer function G(s). Compensation circuit 30 serves to provide stability in the speed control feedback loop. The design of compensation circuits such as that shown in FIG. 2 is well known to those in the art.

Speed control circuitry utilizing frequency comparison techniques rather than phase can alternatively be employed and is well known in the art.

Before discussing the self-starting characteristics of the present invention, it will be helpful to discuss the signals and fields present in the circuitry of FIG. 1 when the motor is operating at a steady speed. To simplify the explanation, it will be assumed that the torque signal $V_T$ is a reference voltage and the motor 12 is not synchronized to a speed command signal. The extension of this explanation to circuitry wherein speed control circuitry 27 is added to synchronize the motor with a speed command signal will be readily apparent to those of ordinary skill in the art.

Figure 3:
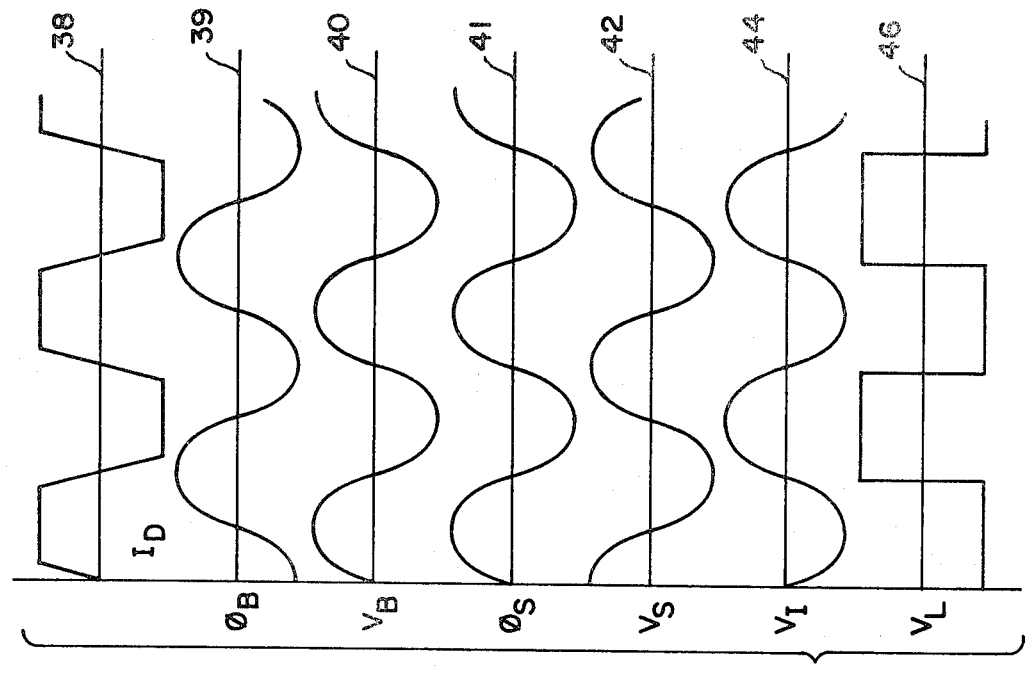
FIGS. 3 and 4 show waveforms from the circuits of FIGS. 1 and 2 useful for explaining the operation of the invention.

Referring to the waveforms shown in FIG. 3, when rotor 14 is rotating, it is torqued by a magnetic field produced by a current $I_D$ driven through drive-winding 16 by power stage 20. A flux $\phi_B$ from rotor 14 couples into winding 16 and produces a back EMF voltage $V_B$ across winding 16. Voltage $V_B$ is the time derivative of the flux $\phi_B$ as shown in FIG. 3. In steady state motoring operation the control circuitry causes the drive current $I_D$ to be in phase with the back EMF $V_B$ to produce only positive work in the following manner. As rotor 14 revolves, a signal $V_S$ is induced in winding 18 by the magnetic field $\phi_S$, coupling winding 18 and rotor 14. As can be seen from FIG. 3, the flux $\phi_S$ producing the $V_S$ signal in winding 18 will in normal operation be in phase with the current $I_D$ through drive-winding 16. The voltage produced by the flux $\phi_S$ is proportional to the time derivative of the flux coupled into the winding, or in other words, the output voltage $V_S$ from sense winding 18 is shifted in phase by 90 degrees from the flux $\phi_S$. This is shown by waveform 42 in FIG. 3 which shows the sense winding output voltage $V_S$.

The $V_S$ signal from sense winding 18 is applied to integrator 22 which integrates this signal to provide the integrator output voltage $V_I$. The integrator inverts the $V_S$ signal and produces a further 90 degree phase shift to provide the output signal $V_I$ from integrator 22 shown by waveform 44 in FIG. 3. The output $V_I$ from integrator 22 is squared up by limiter circuit 24 to provide the $V_L$ waveform 46.

From FIG. 3 it can be seen that the output signal $V_L$ from limiter 24 is the inverse of the drive current $I_D$ required to drive the stator winding 16. Accordingly, the proper polarity of the current in winding 16 may be achieved by controlling the current polarity in the drive winding 16 by the output of limiter circuit 24. The circuitry of FIG. 1 does this by commutating the torque signal $V_T$ applied to commutation circuit 24 in response to the output signal from limiter 24. Thus, the circuitry shown in FIG. 1 controls the polarity of the drive current $I_D$ to produce a net average torque on the rotor of permanent magnet motor 14 to provide rotation of the rotor.

In the case where speed control circuitry 27 is included, the operation of the circuitry in FIG. 2 is similar to that described above. In the example shown in FIG. 2 having a square-wave speed command signal and a square-wave output $V_L$ from limiter 24, the output signal from phase detector 28 is a pulse-width-modulated signal whose average magnitude is representative of the torque to be applied to rotor 14 to keep rotor 14 in synchronism with the speed command signal. It will be appreciated by those familiar with the art that the signals applied to phase detector 28 need not be limited, or digital, signals. Either or both of the signals applied to phase detector 28 may be analogue signals.

The system shown in FIG. 1 is a closed-loop commutation circuit which controls the polarity of the current through drive-winding 16 in order to produce the maximum torque per amp of drive current $I_D$ on rotor 14. When rotor 14 is stationary and power is initially applied to drive-winding 16, the magnetic field of the permanent magnet rotor 14 and the current in drive-winding 16 will interact causing the rotor to start to turn. As rotor 14 turns, the magnetic field in sense winding 18 changes causing an output voltage $V_S$ to be produced. The magnitude and phase of the $V_S$ signal are dependent upon the rotor position and speed and provide an indication thereof. The instantaneous value of $V_S$ is proportional to the time derivative of the flux $\phi_S$, and when the $V_S$ signal is integrated by integrator 22, the peak amplitude of the integrator output signal does not vary with motor speed. The phase of the integrator output signal $V_I$ thus represents the rotor position, and when applied to power stage 20 through limiter 24 and commutator 26, the signal from sense winding 18 will cause a current to be produced by drive winding 16 which always torques the rotor in the direction determined by the polarity of the torque command signal $V_T$.

Thus, with the circuit shown in FIG. 2, there is no ambiguity in the direction in which the rotor will rotate. Operation in the wrong direction (i.e., in a direction opposite that commanded by $V_T$) causes a decelerating torque to zero speed followed by acceleration in the correct direction to final speed.

A major advantage of the present invention is its ability to reliably self-start even a loaded motor without using auxiliary transducers or complex starting circuitry. The present invention always operates in closed-loop mode, even during start-up. Every commutation including the first commutation, is accurately controlled by the rotor position.

The motor circuit in FIGS. 1 and 2 includes initializing circuitry to ensure that the rotor position and integrator state correspond before motor start-up. An initialize signal is applied during an initialization period to a disable input to power stage 20 and also to two switches 60 and 62. A reference voltage $V_R$ is applied via switch 60 and a resistor 64 to sense winding 18. The reference voltage $V_R$ is applied via switch 62 and resistor 66 to the input of operational amplifier 21, by-passing the resistor 23 of integrator 22.

To start the motor, the initialize signal disables power stage 20 so that no current flows through drive winding 16. The initialize signal also closes switch 60 so that the reference voltage $V_R$ is applied through resistor 64 to winding 18 causing a current to flow in winding 18 and produce a magnetic field. Thus, during the initialization period, a torque is created by current in winding 18 which forces the rotor angle $\theta$ in FIG. 1 to a position where $\theta$ nominally equals 0°. (This is true in all situations except when rotor 14 is at a false null position with respect to winding 18. This is discussed further below.)

The initialize signal also closes switch 62, and reference voltage $V_R$ is connected via resistor 66 to the inverting input of op-amp 21. Since the inverting input of op-amp 21 is a virtual ground, the integrator output signal $V_I$ must go to a voltage sufficient to cause an equal and opposite current to flow through resistor 50 into the node at the inverting input of the op-amp. The voltage drop across resistor 50 is stored on integrating capacitor 25. Thus, when switch 62 closes, the output voltage from integrator 22 is set to a predetermined value. By setting this voltage to represent the flux coupling from permanent magnet rotor 14 to winding 18 at a rotor angle of 0°, the state of integrator 22 will represent the actual position of the rotor flux at start-up.

The proper voltage from integrator 22 to represent the $\theta$ equals 0° position is given by the following equation:

$$V_I = \phi_M N_S / RC$$

where $\phi_M$ is the flux coupling the permanent magnet rotor and sense winding 18 at $\theta$ equals 0°, $N_S$ is the number of turns on winding 18, R is the value of resistor 23 and C is the value of capacitor 25.

Figure 4:
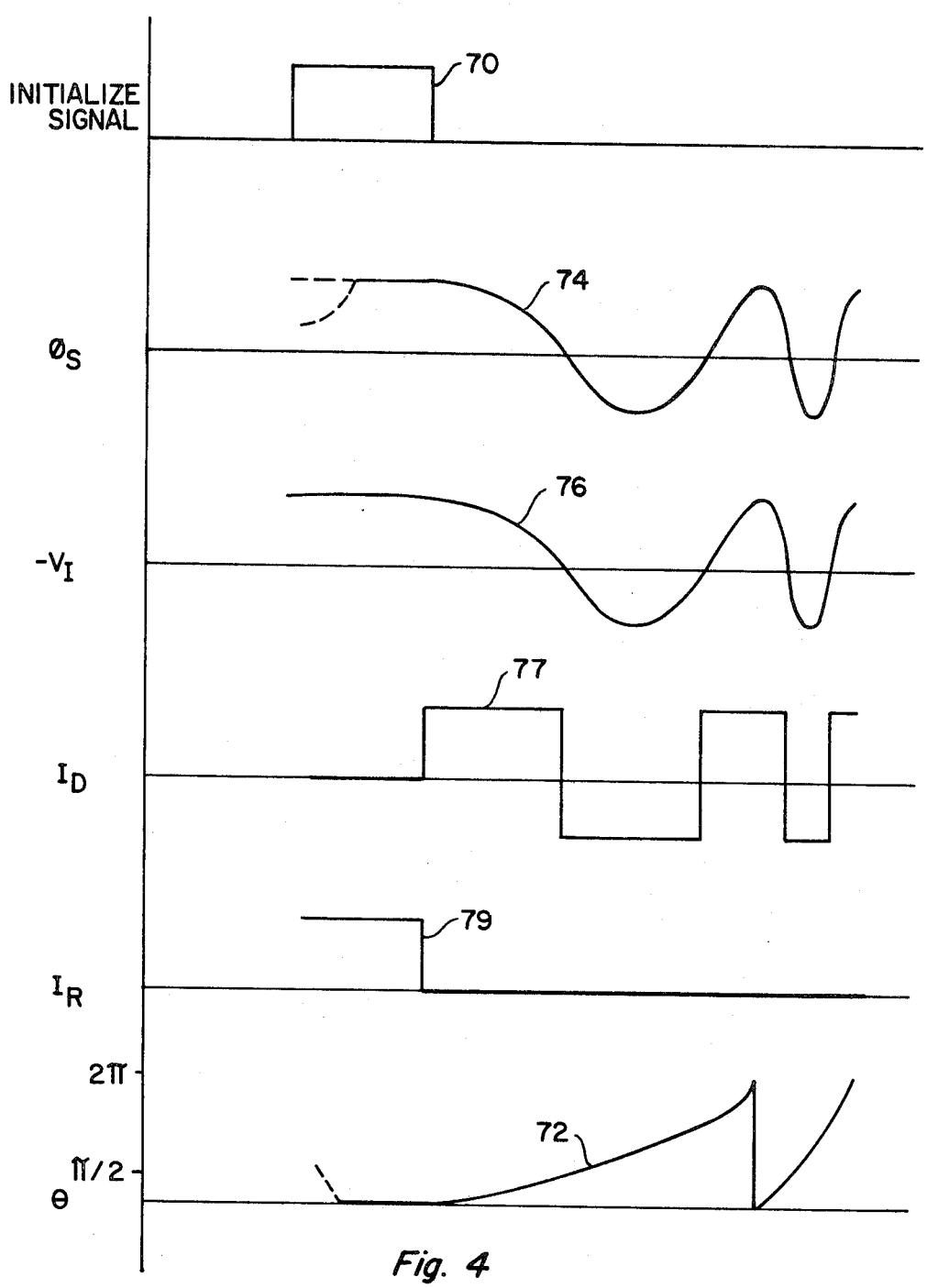

After the initialization period, the initialize signal returns low, enabling power stage 20 and opening switches 60 and 62. The state of integrator 22 now accurately represents the position of rotor 14, and motor 12 will start up with minimal initial transient. This can be seen by referring to the wave-forms in FIG. 4. Waveform 70 represents the initialize signal. While the initialize signal is high, rotor 14 is forced to an angle of 0°, as shown by waveform 72. With rotor 14 at the 0° position, the flux $\phi_S$ coupling rotor 14 and sense winding 18 is at a maximum, as shown by waveform 74. The output voltage $V_I$ from integrator 21 is set to a predetermined value in accordance with the equation above, as shown by waveform 76. For convenience $V_I$ is shown inverted on FIG. 4. When the initialize signal goes low, the closed loop commutation operation of the circuit in FIG. 2 is activated. For the motor to reliably start-up, the time constant of capacitor 25 and resistor 50 must be relatively long with respect to the time period of the first quarter revolution of rotor 14. In multi-speed motors, this requirement is met if the integrator does not loose appreciable charge during the first electrical quarter-cycle. In practice, this requirement is easily met. In a typical start from zero speed, the circuit produces a magnetic field from drive winding 16 which applies maximum torque to rotor 14 as it accelerates to its final speed. As can be seen from the waveforms in FIG. 4, the drive winding current $I_D$, waveform 77 and the rotor position indicated by $\phi_S$, waveform 74, are always synchronized, resulting in high torque capability at start and minimum start-up time.

The above-described start-up operation occurs in all situations except when the rotor 14 is stopped at or near the false null position (i.e., with $\theta$ equal to 180°) at the beginning of the initialization period. This null position is unstable, so in most applications, the rotor will quickly flip around to the 0° position in response to the magnetic field from motor winding 18 during the initialization period. If the rotor has high starting friction, however, the rotor may remain at or near the null position during the initialization period, since the torque applied by winding 18 is zero or very small around this null position. The torque applied to rotor 14 by drive winding 16 is a maximum at this null position, however, and at the end of the initialization period, when power stage 20 is enabled, the magnetic field from power stage 20 will always cause rotor 14 to begin to turn. Thus, the circuitry shown in FIG. 1 will ensure that motor 12 will always start even if rotor 14 is not properly initialized. If rotor 14 is initially at the false null position, there may be a large start-up transient, but this situation is considered abnormal and should be infrequent.

The possibility of a start-up transient, caused by rotor 14 being in the false null position, may be eliminated by going to a two step initialization process. The two step initialization process is the same as that described above, except that the initialization period is started by passing a DC current through drive winding 16. This current is then removed and the initialization process proceeds as described above, with a current passing through sense winding 18. If the rotor is initially stopped at a false null position (i.e. $\theta$ equals 180°), the current flowing through drive winding 16 at the beginning of the initialization period will cause rotor 14 to move from the false null position to a 90° position, ensuring that the subsequent current through sense winding 18 always moves rotor 14 to the 0° position.

An alternate method for avoiding the occurrence of a start-up transient when rotor 14 is in the false null position is to provide a small oscillating magnetic field from drive winding 16 during the initialization period. This may be done, for example, by providing an oscillator which is selectively connected into power stage 20 in response to the initialize signal, so that during the initialization period, an oscillating magnetic field is produced from drive winding 16. This field may be much smaller than the field from sense winding 18 during the initialization period. If rotor 14 is at the false null position, the field from drive winding 16 produces maximum torque on rotor 14. The result is that rotor 14 will be moved from the null position by the relatively small oscillating field from drive winding 16 until it is captured and moved to the 0° position by the DC field from sense winding 18.

A third method for initializing the rotor is to alternate DC signals between the drive and sense windings at a high enough rate so that rotor 14 cannot rotate significantly during one period of the alternation frequency. This aligns rotor 14 at a 45° angle with respect to the sense and drive windings. Integrator 22 is initialized to represent a 45° position for rotor 14, and motor 12 will start with no start-up transient.

Yet another method for eliminating null spots and start-up transients is the use of asymmetrical stator laminations to provide an initializing reluctance torque. In this case it is not necessary for current to flow in the sense winding 18, so switch 60 and resistor 64 may be eliminated. Other circuits for initializing the position of rotor 14 and the state of integrator 22 will be obvious to those of ordinary skill in the art.

While the initialize signal can be externally supplied, more reliable wheel operation is achieved if wheel conditions are sensed and used to self-generate the initialize signal. This allows an external mechanical disturbance to stop the wheel, and it will automatically restart. Such a circuit is shown in FIG. 5.

In FIG. 5, the $V_I$ output signal from integrator 22 is applied via an inverting amplifier 98 to the non-inverting input of a comparator 100. A reference voltage $V_O$ is applied to the inverting input of comparator 100. The output signal from comparator 100 is applied to the trigger input of a timer circuit 109. The output of timer circuit 109 is applied to the trigger input of a second timer circuit 110. The output of the second timer circuit 110 provides the initialization signal.

Timer circuit 109 operates in the following manner. A comparator 100 has a positive reference voltage $V_O$ applied to its inverting input. A positive voltage is applied through a resistor 101 to the non-inverting input of the comparator, which is connected to ground through a capacitor 102 and an electronic switch 103 connected in parallel.

Switch 103 opens and closes in response to the trigger input to the timer. When the signal from comparator 100 input is high, switch 103 is closed and the voltage $V_A$ at the non-inverting input to comparator 104 is clamped to ground, resulting in a low output from comparator 104. If the trigger input from comparator 100 goes low, switch 103 opens, and the voltage $V_A$ on capacitor 102 begins to charge toward the V+ voltage through resistor 101. If the trigger input to timer 109 does not return high before the $V_A$ voltage rises above the reference voltage, the timer output will go high until the trigger input signal returns to a low level, closing switch 103 and discharging capacitor 103.

Timer 110 works in a similar fashion, but with reversed polarity. The non-inverting input of comparator 108 is connected to ground through a resistor 107 and to V+ through a capacitor 106 and an electronic switch 105 controlled by the trigger input to timer 110. Thus the output of timer 110 will be high as long as the trigger input is high and will go low if the trigger input remains low for long enough for the voltage $V_B$ to discharge through resistor 107 to less than the $V_O$ reference voltage.

The operation of the circuit shown in FIG. 5 is best understood by referring to the waveforms in FIG. 6.

Timer 109 is reset by comparator 100 each time the negative of integrator output $V_I$ exceeds threshold voltage $V_O$. In normal run operation the negative of the $V_I$ output of integrator 22 exceeds reference voltage $V_O$ each electrical motor cycle, as shown in FIG. 6. This closes switch 103 discharging capacitor 102. The charging time of capacitor 102 to threshold voltage $V_O$ is set longer than the longest motor run or start cycle time.

When the rotor stops turning, no voltage is induced in winding 18, so integrator 22 will tend to remain at its previous level. If $V_I$ is below $V_O$, then after a time, which is determined by resistor 101, capacitor 102, V+, and $V_O$, comparator 104 will close switch 105 causing the initialize signal from comparator 108 to go high. If the wheel should stop with the negative of integrator 22 output $V_I$ above $V_O$, an additional time will be required before restart because resistor 50 must partially discharge integrator capacitor 25. Typically, the time for $V_A$ to charge to $V_O$ would be set somewhat longer than the time the negative of $V_I$ spends below $V_O$ on the first electrical cycle. Connection of capacitor 106 to V+ as shown in FIG. 5 allows this circuit to also generate a power turn-on initialization period.

If the rotor is locked or held in a stopped position, the initialize signal is cycled on and off by the action of timers 109 and 110. When the initialize signal is on, the integrator is preset to a state where the negative of its output $V_I$ exceeds $V_O$, and comparator 100 triggers timer 109. The output from timer 109 then goes low, opening switch 105, and after an interval determined by timer 110, the initialize signal returns low. If the rotor does not begin to turn, the $V_I$ output from integrator 22 decays until it drops below $V_O$, and the above process is repeated.

Thus with a locked rotor, motor excitation flux is cycled between two 90° orientations. Accordingly, motor rotation will begin within one of these cycles if and when the rotor is released.

There has been described a new and unique self-starting transducerless brushless permanent magnet motor drive circuit having many advantages over prior art circuits. It should be appreciated that the present invention may be applied to permanent magnet motors of different configurations than those shown in the drawings or discussed in the description of the preferred embodiments described herein. Accordingly, the invention should not be limited by the exemplary circuits shown herein, but should only be interpreted in accordance with the appended claims.

What is claimed is:

1. A self-starting brushless permanent magnet motor, comprising:
    first and second windings;
    a magnetic member, the windings and the magnetic member being rotatable about an axis relative to each other;
    means for defining an initialization period prior to operation of the motor;
    means for rotating the magnetic member to a predetermined position during the initialization period;
    means for integrating an input signal applied thereto to provide an output signal;
    means for initializing the integrating means during the initialization period such that the integrating means output signal represents the flux coupling the magnetic member to the first winding when the magnetic member is at said predetermined position;
    means, operative after the initialization period, for applying to the integrating means input a signal produced in the first winding by the magnetic flux coupling the magnetic member and the first winding, so that the integrator output signal is representative of the position of the rotor with respect to the windings; and
    means, responsive to the integrating means output signal, for sending a drive current through the second winding to produce a torque on the magnetic member, the drive current being determined as a function of the integrator output signal while the motor is operating, thereby to provide closed-loop starting and operation of the permanent magnet motor.

2. The motor of claim 1 wherein the first and second windings are in a phase quadrature relationship with respect to said axis.

3. The motor of claim 1 wherein the rotating means includes means for applying a signal to the first winding during the initialization period to move the magnetic member to a predetermined position.

4. The motor of claim 3 further comprising means for preventing current from flowing through the second winding during the initialization period.

5. The motor of claim 4 further comprising means for applying a DC signal to the second winding prior to the initialization period to move the magnetic member to a position ninety degrees from said predetermined position.

6. The motor of claim 1 wherein the means for defining an initialization period includes detection means, responsive to the integrating means output signal, for detecting when the magnetic member is not rotating and for providing, in response to detection thereof, an initialization signal defining the initialization period.

7. The motor of claim 6 wherein the detection means includes means for detecting when the integrating means output signal does not exceed a threshold level within a predetermined length of time and for providing the initialization signal in response thereto.

8. The motor of claim 7 wherein the detection means further includes means for alternately applying signals to the first and the second windings so long as the magnetic member does not rotate with respect to the windings.

9. The motor of claim 4 wherein the initialization means includes means for detecting when the integrator output signal does not exceed a threshold level within a predetermined interval and in response thereto providing an initialization signal of a preset duration to define the initialization period.

10. The motor of claim 9 wherein the initializing means is operative to initialize the integrating means such that the integrating means output signal is larger than said threshold level at the end of the initialization period.

11. The motor of claim 1 wherein the means for sending a drive current comprises:
    means for providing a torque control signal representative of torque to be applied to the magnetic member; and
    commutation means, responsive to the torque control signal and the integrating means output signal, for producing a drive current, the amplitude of which is controlled by the torque command signal and the phase of which is controlled by the integrating means output signal.

12. The motor of claim 2 wherein the means for sending a drive current, comprises:
- means for providing a torque control signal;
- commutation means, responsive to the integrating means output signal, for producing an output signal by selectively inverting the torque control signal as a function of the polarity of the integrating means output signal; and
- means for sending a current through the second winding which is proportional to the commutation means output signal.

13. The motor of claim 1 further comprising means for synchronizing the rotation of the motor to a periodic speed control signal.

14. The motor of claim 13 wherein the synchronizing means includes:
- phase detection means responsive to the speed control signal and the integrating means output signal for providing an output signal proportional to the phase difference therebetween; and
- means, responsive to the phase detection means output signal, for providing the torque control signal.

15. The motor of claim 1 wherein the means for rotating includes:
- means for preventing current from flowing in the second winding during the initialization period; and
- means for providing a reluctance torque in the motor which tends to move the magnetic member to the predetermined position.

16. The motor of claim 15 wherein the means for providing a reluctance torque includes asymmetrical stator laminations.

17. A method for providing a self-starting permanent magnet motor having first and second windings and a magnetic member, the windings and the magnetic member being rotatable about an axis relative to each other, the method comprising the steps of:
- providing a first signal representative of the magnetic field coupling the magnetic member and the first winding;
- rotating the magnetic member to a predetermined position during an initialization period prior to operation of the motor;
- initializing an integrator during the initialization period so that the integrator output signal represents the flux coupling the magnetic member to the first winding when the magnetic member is at said predetermined position;
- integrating the first signal with the integrator during motor operation to provide an integrator output signal representative of the position of the magnetic member relative to the windings; and
- applying a drive current to the second winding to provide a magnetic field therefrom for producing a torque on the magnetic member, the drive current being a function of the integrator output signal and being applied to the second winding during motor operation, thereby to provide closed-loop starting and operation of the motor.

18. The method of claim 17 wherein the first and second windings are in a phase quadrature relationship with respect to said axis; and
- wherein the step of integrating includes the step of shifting the phase of the first signal by ninety degrees.

19. The method of claim 17 further comprising the step of applying a DC signal to the first winding during the initialization period to move the magnetic member to a predetermined position.

20. The method of claim 19 further comprising the step of removing the drive current from the second winding during the initialization period.

21. The method of claim 20 further including the step of applying a DC signal to the second winding prior to the initialization period to move the magnetic member to a position ninety degrees from said predetermined position.

22. The method of claim 17 further comprising the step of applying an AC signal to the second winding during the initialization period, the AC signal being smaller in magnitude than the DC signal applied to the first winding during the initialization period.

23. The method of claim 17 further including the step of applying signals during the initialization period alternately to the first and second windings to produce an alternating magnetic field therefrom, the frequency of alternation being high enough so that the magnetic member does not rotate by more than about ninety degrees during one period of the alternating magnetic field, whereby the magnetic member is moved to a predetermined position.

24. The method of claim 17 wherein the step of rotating further comprises the steps of:
- preventing current from flowing in the second winding during the initialization period; and
- providing a reluctance torque in the motor to move the magnetic member to the predetermined position during the initialization period when current is not flowing in the drive winding.

* * * * *